United States Patent [19]  [11]  4,363,571
Jackson et al.  [45]  Dec. 14, 1982

[54] SYSTEM FOR FEEDING PULVERULENT MATERIAL INTO A PRESSURIZED AIR CONVEYOR PIPELINE

[75] Inventors: Carroll V. Jackson, Northbrook; Blase C. Rau, Western Springs, both of Ill.

[73] Assignee: United Conveyor Corporation, Deerfield, Ill.

[21] Appl. No.: 272,762

[22] Filed: Jun. 10, 1981

Related U.S. Application Data

[63] Continuation of Ser. No. 137,482, Apr. 4, 1980, abandoned.

[51] Int. Cl.³ ............................................. B65G 53/48
[52] U.S. Cl. ............................... 406/56; 198/601; 198/608; 198/669; 406/120; 414/218; 414/221
[58] Field of Search ..................... 406/53, 56, 61, 64, 406/118–120; 414/218, 220, 221; 198/545, 548, 601, 608, 669

[56] References Cited

U.S. PATENT DOCUMENTS

| 529,842 | 11/1894 | Schultz | 198/669 X |
|---|---|---|---|
| 977,849 | 12/1910 | Bernert . | |
| 1,321,262 | 11/1919 | Townsend | 406/64 |
| 1,872,028 | 8/1932 | Collins . | |
| 2,311,773 | 2/1943 | Patterson . | |
| 2,393,412 | 1/1946 | Riddell . | |
| 2,644,725 | 7/1953 | Doull et al. . | |
| 2,687,816 | 8/1954 | Messing | 414/220 |
| 2,705,080 | 3/1955 | Hicks | 414/220 |
| 3,232,419 | 2/1966 | Rasmussen . | |
| 3,315,824 | 4/1967 | Kirchhoefer | 414/221 |
| 3,413,039 | 11/1968 | Asgeirsson | 406/64 X |
| 3,485,535 | 12/1969 | Fabre | 406/61 |

OTHER PUBLICATIONS

United Conveyor Corporation NUVA Feeder Positive Pressure Pneumatic Conveyor, (Bulletin No. 4 NF-68A, copyright 1968), pp. 5, 8 and 9.

Primary Examiner—Jeffrey V. Nase
Attorney, Agent, or Firm—Wegner, McCord, Wood & Dalton

[57] ABSTRACT

A system for moving large quantities of pulverulent material from receiving hoppers, such as those of a fly ash precipitator, into a pressurized air conveyor pipeline. Separate auger conveyors move material from a first line of receiving hoppers and from a second line of receiving hoppers into gravity material inlets at opposite ends of an effectively airtight casing of a pressure mechanical conveyor wherein auger conveyor screws of opposite hand move it toward a central outlet through which it drops into the pressurized air conveyor pipeline. The auger conveyors and the pressure conveyor augers operate continuously; and the system is cycled to alternately feed material into the pressure conveyor casing at receiving hopper pressure, which is about atmospheric pressure, and out of the pressure conveyor casing at pipeline pressure. The cycles of two or more pressure conveyors are out of phase with one another so they feed material into the pipeline consecutively to provide level pipeline flow. If the material comes from precipitator hoppers which are filled by material dropping from a gas stream, the airtight pressure mechanical conveyor is at the upstream ends of the lines of receiving hoppers.

30 Claims, 6 Drawing Figures

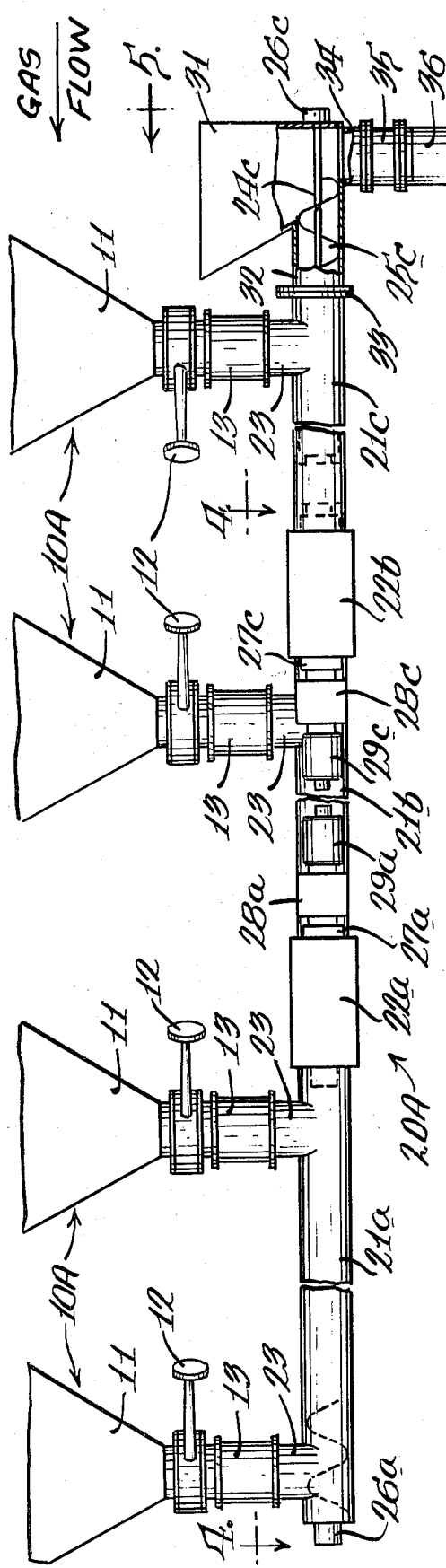
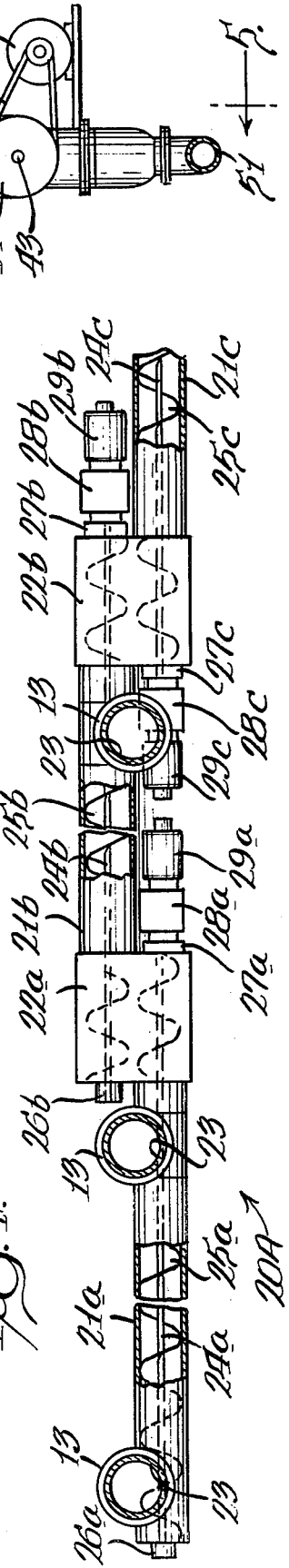

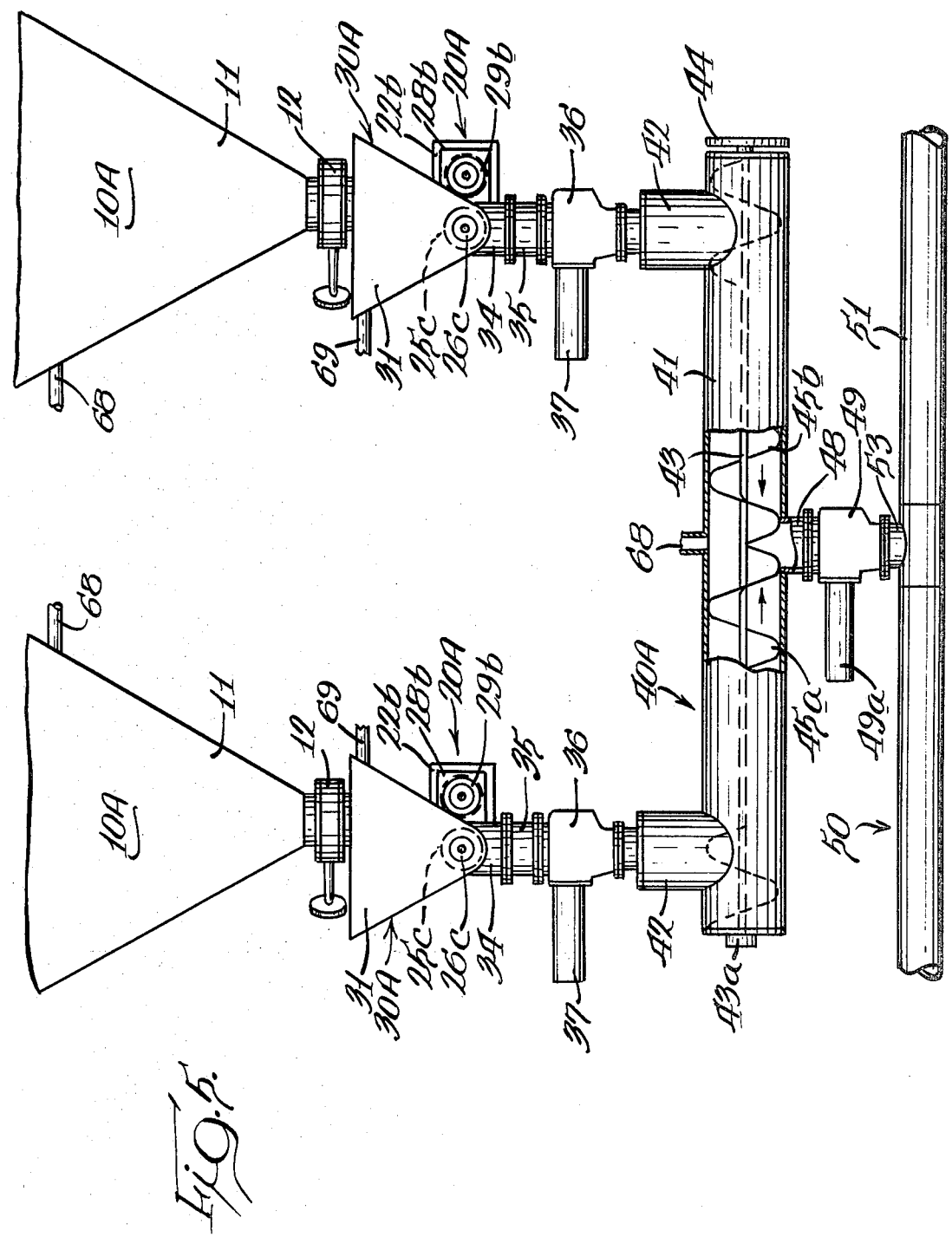

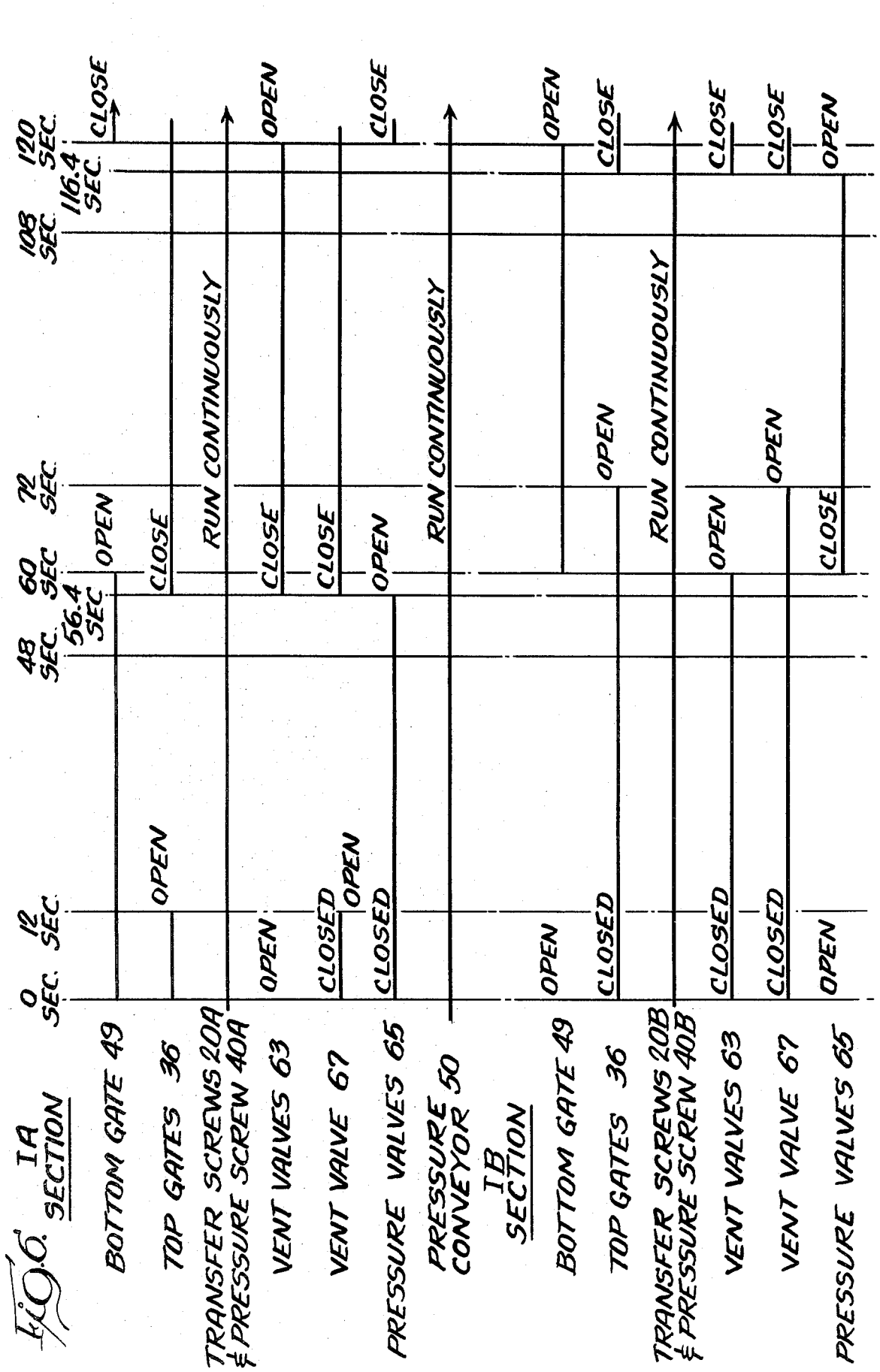

SYSTEM FOR FEEDING PULVERULENT MATERIAL INTO A PRESSURIZED AIR CONVEYOR PIPELINE

CROSS REFERENCE TO RELATED APPLICATIONS

This application is a continuation of applicants' copending U.S. patent application Ser. No. 137,482, filed Apr. 4, 1980 now abandoned.

BACKGROUND OF THE INVENTION

There are certain types of industrial operations which produce enormous quantites of pulverulent material. Orderly transfer of such material from the units that produce it to a transportation system presents substantial problems which are aggravated by the nature of the material which makes to inherently difficult to design systems for its orderly handling.

A severe problem is presented by the fly ash produced by the high efficiency coal burning furnaces and collected in the precipitators of electric power generating plants. A large coal burning power facility can produced many tons of fly ash an hour; and it is extremely difficult material to handle because it is about as fine as talcum powder, is very abrasive, and has a great tendency to lump and cake in hoppers and conveyors. This makes it difficult to obtain a reasonably even flow of material into a device such, for example, as a pressure-type pneumatic conveyor which is very efficient for moving pulverulent material.

SUMMARY OF THE INVENTION

In accordance with the present invention, pulverulent material is moved from the receiving hoppers of precipitators into a pressurized air conveyor pipeline by a system of mechanical transfer conveyors from which the material drops by gravity into pressure mechanical conveyors; and from the pressure mechanical conveyors the material passes into the pressurized air conveyor pipeline.

The receiving hoppers and the mechanical transfer conveyors operate at about atmospheric pressure; while the pressure screw conveyors are cyclically switched between receiving hopper pressure and a pressure equal to that in the pressurized air conveyor pipeline.

In a single feeding cycle the bottom gate valve which is between the pressure mechanical conveyor and the pressurized air conveyor pipeline is originally closed, and the top gate valves between the mechanical transfer conveyors and the pressure mechanical conveyor are open. The transfer mechanisms for moving material from the receiving hoppers, the conveyor means in the pressure mechanical conveyors, and the pipeline operate continuously. During a material receiving phase of the cycle the pressure mechanical conveyors must be at the same pressure as are the receiving hoppers and the transfer conveyors, which is about atmospheric pressure.

At the end of the material receiving phase, which is controlled to effectively fill the pressure conveyor casing, the top gates are closed, a vent valve from the pressure mechanical conveyor is closed, and a pressure valve is opened to raise the pressure in the pressure mechanical conveyor casing to the same level as that in the pressurized air conveyor pipeline. When this pressure is equalized, the bottom gate valve is opened and the continuously operating pressure conveyor mechanism moves the material out of the pressure mechanical conveyor casing into the pressurized air conveyor pipeline during a material discharge portion of the cycle.

After effectively all the material in the pressure mechanical conveyor casing has been discharged, the bottom gate and the pressure valve are closed and the vent valve for the pressure mechanical conveyor casing is opened to return that unit to receiving hopper pressure, whereupon the top gates are opened to start a new cycle. The cycle is controlled to effectively entirely fill and empty the pressure mechanical conveyor casing.

In a plant the receiving hoppers may be divided into two or more sets, here for convenience limited to two sets (I and II); and each set has an A section and a B section. While the pressure mechanical conveyor of the I-A section is in the first, or filling portion of a cycle, the pressure mechanical conveyor for the I-B section is in the second, or discharge portion of the cycle. The pressure mechanical conveyors of the II-A and II-B sections are one-quarter cycle out of phase with those of the I-A and I-B sections.

In addition, the two ends of a pressure mechanical conveyor casing receive material simultaneously from two transfer conveyors; and in the casing are conveyors which are driven to move material from both ends toward the transverse median plane of the casing to be fed into the pressurized pipeline through a bottom gate valve which is on that transverse median plane.

Preferably the transfer conveyor mechanisms and the pressure conveyor mechanisms are augers; and in the latter units these are two augers of opposite hand on a single shaft.

THE DRAWINGS

FIG. 3 is a fragmentary sectional view on an enlarged scale taken substantially as indicated along the line 3—4 of FIG. 1;

FIG. 4 is a fragmentary sectional view taken substantially as indicated along the line 4—4 of FIG. 3;

FIG. 5 is a fragmentary sectional view taken substantially as indicated along the line 5—5 of FIG. 3; and FIG. 6 is a cycle chart for the system illustrated diagrammatically in FIG. 1.

DETAILED DESCRIPTION OF THE INVENTION

Figure 1:
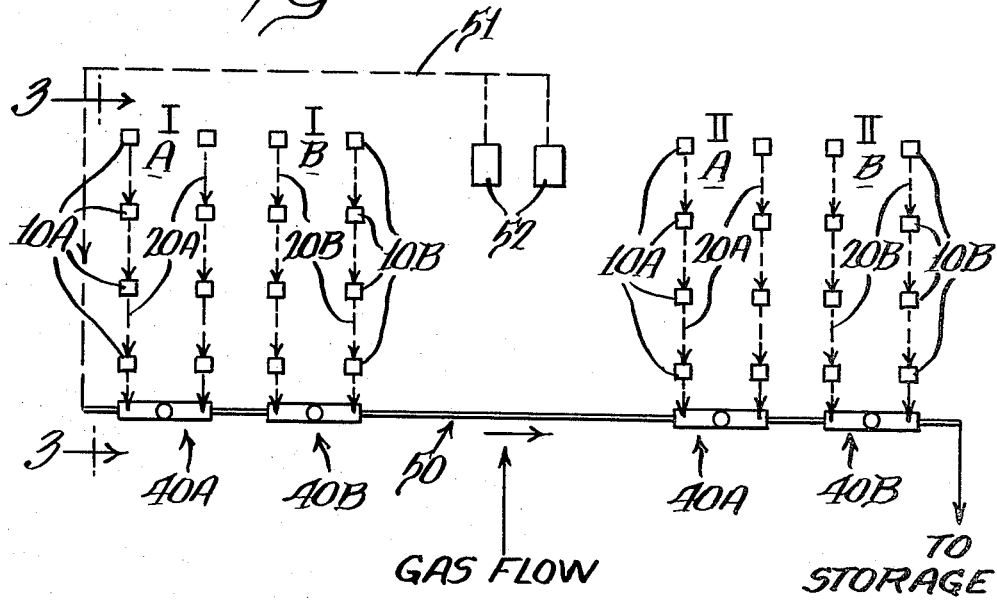
FIG. 1 is a diagrammatic plan view of a typical system embodying the present invention.

Referring to the drawings in detail, and referring first to FIGS. 1 to 5, a typical system utilizing the present invention consists generally of a set I and a set II, each consisting of sixteen precipitator receiving hoppers. Each set has an A section of eight receiving hoppers, each indicated generally at 10A; a B section of eight receiving hoppers, each indicated generally at 10B; transfer conveyor screw means, indicated generally at 20A and 20B, to move pulverulent material from the respective receiving hoppers 10A and 10B; respective surge hoppers for the two sections such as the surge hoppers indicated generally at 30A in FIG. 2; pressure screw conveyors, indicated generally at 40A and 40B, for the respective sections; pressurized air conveyor means, indicated generally at 50; two air and valve systems such as the system indicated generally at 60A in FIG. 2, for varying air pressure in the pressure screw conveyors 40A and 40B and for venting the surge hoppers 30A and 30B; and a control system which causes the entire feeding system to operate in accordance with the cycles shown in FIG. 6. The components and arrangement of such a control system are believed to be so well known to those skilled in the art as to make detailed electrical and hydraulic schematics unnecessary. Any engineer skilled in the art of cycling material handling systems needs no more than his ordinary engineering skill to construct the material handling system of the present invention from this disclosure and cause it to cycle in accordance with the requirements of FIG. 6.

It is apparent from FIGS. 1 and 3 that a single transfer screw conveyor means 20A moves material from four receiving hoppers 10A; and that a single pressure screw conveyor 40A or 40B receives material from two transfer screw conveyors 20A or 20B, so that each pressure screw conveyor 40A or 40B handles the material from eight receiving hoppers 10A or 10B.

In FIGS. 1 and 3 the arrow indicating direction of gas flow shows the direction in which fly ash travels in the precipitator. The receiving hoppers 10A or 10B which are farther downstream receive progressively less ash. In order to minimize wear of the transfer screw means 20A and 20B, the delivery of ash from the receiving hoppers is counter to the gas flow; so that most of the ash travels the shortest distance to the pressure screw conveyors 40A or 40B.

Turning now to the construction of the various components of the system, each of the receiving hoppers 10A and 10B is seen to consist of the usual bin 11 which, in a fly ash handling system, receives ash from the fly ash precipitators of a coal burning furnace. At the lower end of each bin 11 is an isolation valve 12 which connects by an expansion joint 13 to the transfer screw means 20A.

Referring particularly to FIGS. 3 and 4, each of the transfer screw means 20A and 20B is best seen in FIGS. 3 and 4 to comprise a series of cylindrical housings 21a, 21b and 21c, and transfer boxes 22a and 22b. The housings have inlet pipes 23 which connect to the expansion joints 13. Auger shafts 24a, 24b and 24c extend the full lengths of the respective housings 21a, 21b and 21c, and on the shafts are respective augers 25a, 25b and 25c. The augers 25a and 25b overlap at the transfer box 22a; while the augers 25b and 25c overlap at the transfer box 22b.

Each of the auger shafts 24a, 24b and 24c has one end portion journalled in a respective thrust bearing 26a, 26b or 26c; and the other end portion is carried in a respective journal 27a, 27b or 27c and drivingly connected to an output shaft of a respective gear box 28a, 28b or 28c which is driven by an electric motor 29a, 29b or 29c. The power requirements, of course, depend upon the lengths, diameters and pitches of the various augers, the specific gravity and frictional characteristics of the material being conveyed, and the extent to which the material is fluffed by air in the conveyor housing. Thus, the horsepower ratings of the motors must be individually calculated for each system in accordance with known engineering principles.

Referring now to FIGS. 3 and 5, each of the surge hoppers 30A or 30B consists of a bin 31 which has a bottom infeed pipe 32 with a flange 33 bolted to a mating flange on the transfer screw housing 21c. As seen in FIG. 3, each surge hopper bin 31 has an auger shaft 24c extending through it, and the auger 25c terminates at the entry side of the bin. Below each of the surge hopper bins 31 is a discharge throat 34 which connects through an expansion joint 35 with a top material control gate valve, indicated generally at 36, which is a device in which gate operation is by means of any suitable pneumatic or hydraulic cylinder 37.

As seen in FIG. 5, each of the pressure screw conveyors 40A and 40B consists of an effectively airtight cylindrical casing 41 which has an inlet pipe 42 near each of its ends that makes a flanged connection with the lower or outfeed side of one of the top gate valves 36. An auger shaft 43 in the casing 41 has one end supported in a journal 43a at one end of the casing, while the other end of the shaft carries a drive sheave or sprocket 44. Screw conveyor members 45a and 45b of opposite hand are mounted upon the auger shaft 43, and an electric motor 46 has a drive belt or chain 47 to drive the auger shaft 43 in a direction to move material from both ends of the casing 41 toward the transverse median plane of the casing as indicated by the arrows in FIG. 5.

On the transverse median plane of the casing 41 is a discharge pipe 48 which makes a flanged connection to a bottom material control gate valve, indicated generally at 49 which, like the top gate valve 36, is a device in which gate operation is by means of any suitable pneumatic or hydraulic cylinder 49a.

The pressure conveyor 50 is seen in FIG. 1 to consist of a pipeline 51 which is connected to a low pressure air source 52; and the pipeline 51 runs directly beneath the four pressure screw conveyors 40A and 40B and is provided with four inlet pipes 53 each of which makes a flanged connection with the lower, or discharge end of one of the bottom gates 49. The pipeline 51 is of a conventional type commonly used to move pulverulent material to a storage silo.

Figure 2:
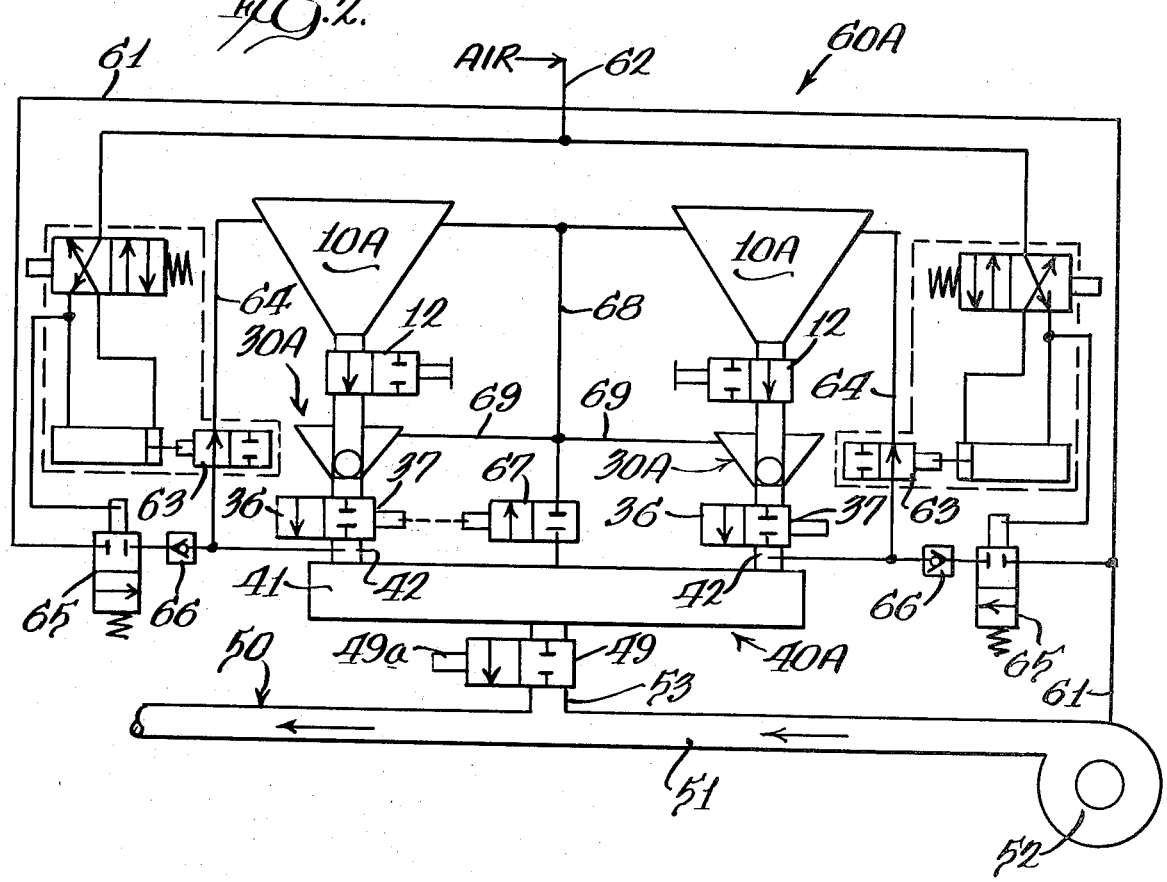
FIG. 2 is a diagram of the air and valve system for the A section surge hoppers and pressure conveyor.

Referring now to FIG. 2, the air and valve system 60A consists of a pressure conduit 61 which is operatively connected to the low pressure source 52; and a high pressure air line 62. FIG. 2 illustrates all the valves in the air and valve system 60A in the positions that they occupy at a time 0.1 second after the beginning of a cycle. All the valves in the system are closed except for open vent valves 63 which put the pressure screw conveyor inlet pipes 42 into communication with the receiving hoppers 10A through conduits 64.

The system 60A also includes pressurizing diaphragm valves 65 and check valves 66 which control the admission of low pressure air from the line 61 to the pressure screw conveyor inlet pipes 42. There is also a vent valve 67 which controls the venting of air through a vent line 68 from the central area of the pressure screw conveyor casing 41 to the receiving hoppers 10A. The vent valve 67 is opened and closed by one of the hydraulic cylinders 37 which operates a top material control gate valve 36. In addition to the vent line 68 from the central portion of the pressure screw conveyor 40A, there are vent lines 69 from the surge hoppers 30A which join the vent line 68 above the vent valve 67, so that the surge hoppers 30A are always in communication with the receiving hoppers 10A and thus remain at receiving hopper pressure, which is about atmospheric.

Turning now to FIG. 6, the chart assumes that the entire system is in continuous operation. The pressure conveyor 50, the transfer screws 20A and 20B, and the pressure screws 40A and 40B all run continuously until the system is shut down. The A section top gates 36 and bottom gate 49 are closed, the A section vent valves 63 are open, the A section vent valve 67 is closed, and the A section pressure valves 65 are closed. The B section bottom gate 49 is open so the pressure screw 40B is feeding into the pressure conveyor 50. The B section top gates 36 are closed, the vent valves 63 and 67 of the B section are closed, and the pressure valves 65 of the B section are open.

At 12 seconds the top gates 36 and the vent valve 67 of the A section both open and remain open until 56.4 seconds of the cycle, so that material is fed into the pressure screw 48 for that period of 44.4 seconds. The top gates 36, the vent valves 63 and the vent valve 67 all close at 56.4 seconds, and the pressure valves 65 open to raise the pressure in the pressure screw casing of the screw 40A to the same pressure as the conveyor 50. 3.6 seconds is allowed for bringing up the pressure in the pressure screw casing, and at 60 seconds of the cycle the bottom gate 49 of the A section opens so the pressure screw 40a may feed material into the pressure conveyor 50. This feed continues for 60 seconds—i.e., to 120 seconds of the cycle, at which time the bottom gate 49 and the pressure valves 65 close the vent valves 63 open to return the casing 41 of the pressure screw 40A to receiving hopper pressure.

In the meantime, at 60 seconds of the cycle, the bottom gate 49 of the I-B section has closed, as have the pressure valves 65 of the I-B section; and the vent valves 63 of the I-B section have opened at the same time. At 72 seconds of the cycle the top gates 36 and the vent valve 67 of the I-B section have opened, and material has been fed from the surge hoppers 30B into the pressure screw 40B from 72 seconds of the cycle until 116.4 seconds of the cycle. At that point the top gates 36, the vent valves 63 and the vent valve 67 of the B section close, and the pressure valves 65 of that section again open. At 120 seconds of the cycle the bottom gate 49 of the B section again opens to feed material for 60 seconds.

The times as above given are not precise, because the various valve operations all require at least 0.1 second.

As previously indicated, the A section and the B section of the II set of receiving hoppers is timed to be one-quarter cycle behind those of the I set. Thus, the entire system feeds into the pressure conveyor 50 at a very steady rate.

It is to be understood, of course, that the system here disclosed is typical, and that there may be considerable variation depending upon operating conditions. Thus, for example, there may be only twelve receiving hoppers 10A in a set, and in that event the transfer screw may be short enough to require only two sections instead of three.

If a plant layout requires six rows of receiving hoppers and three pressure screw conveyors, the cycle must be modified to operate the pressure screws at a lower speed and feed into the pressure conveyor 50 in a 180-second cycle, with two pressure screws feeding into the pressure conveyor at any given time.

Although the system is shown as applied to a precipitator, it is equally applicable to any apparatus which requires transfer of pulverulent material from receiving hoppers into a pressure conveyor.

The foregoing detailed description has been given for clearness of understanding only and no unnecessary limitations should be understood therefrom as modifications will be obvious to those skilled in the art.

We claim:

1. A system for moving pulverulent material from a receiving hopper into a pressurized air conveyor pipeline comprising, in combination:
   pressure mechanical conveyor means which has an effectively airtight, substantially horizontal casing, a material inlet pipe attached to the top of said casing and communicating with the interior thereof, a material outlet pipe attached to the bottom of the casing remote from said inlet, said outlet pipe communicating with the interior of the casing and with the air conveyor pipeline through the top thereof, and a mechanical conveyor in said casing to move material through said casing from said inlet pipe to said outlet pipe;
   transfer conveyor means operatively connected to the bottom of the receiving hopper and to the material inlet pipe of the pressure mechanical conveyor casing, said transfer conveyor means including a material confining pipe and a mechanical conveyor in said pipe;
   primary valve means in said inlet pipe to control movement of material into the casing;
   secondary valve means in said outlet pipe to control movement of material from said casing into the air conveyor pipeline;
   means for varying the air pressure in said casing between a lower pressure close to atmospheric and higher pipeline pressure;
   and control means for filling said casing at said lower pressure and emptying said casing at said higher pressure in a continuous cycle.

2. The combination of claim 1 in which the means for varying pressure in the casing includes a pressure air line communicating with the casing and an air vent line connecting the casing to the receiving hopper, and in which the control means includes a valve in each of said lines and means for closing said valves alternately.

3. The combination of claim 2 in which the pressure mechanical conveyor casing has a material inlet pipe adjacent each end and the material outlet pipe is between said inlet pipes, the mechanical conveyor moves material from both said inlet pipes to said outlet pipe simultaneously, a pressure air line communicates with the casing at each of said inlet pipes, air vent lines connect both inlet pipes with the material receiving hopper and an air vent line connects an area of the casing immediately adjacent the outlet pipe with the material receiving hopper.

4. The combination of claim 1 in which the mechanical conveyor in the casing is an auger.

5. The combination of claim 4 in which the casing has a material inlet pipe adjacent each end, the material outlet pipe is midway between said inlet pipes, and the auger has conveyor screws of opposite hand to move material simultaneously form both inlet pipes to said outlet pipe.

6. The combination of claim 1 in which there is a line of receiving hoppers, and the transfer conveyor means extends beneath and is operatively connected to the bottom of all the hoppers in said line of hoppers.

7. The combination of claim 6 in which the hoppers in the line of hoppers receive progressively less material from one end of said line to the other, and the hopper that receives the most material is nearest to the material inlet pipe of the pressure mechanical conveyor casing.

8. The combination of claim 6 which includes a second line of receiving hoppers, a second transfer conveyor means including a second material confining pipe which extends beneath and is operatively connected to the bottoms of all the receiving hoppers in said second line of hoppers, and a mechanical conveyor in said second material confining pipe, and in which the casing of the pressure mechanical conveyor means has a second material inlet pipe operatively connected to said second transfer conveyor means, the material outlet pipe is between said inlet pipe and said second inlet pipe, and the mechanical coneyor in the casing moves material simultaneously from both inlet pipe to the outlet pipe.

9. The combination of claim 8 in which the pressure mechanical conveyor extends transversely of the lines of receiving hoppers.

10. The combination of claim 8 which includes third and fourth lines of receiving hoppers, third and fourth transfer conveyor means extending beneath and operatively connected to the bottoms of all the receiving hoppers in said third and fourth lines, each of said third and fourth transfer conveyor means including a material confining pipe and a mechanical conveyor in said pipe, a second pressure mechanical conveyor means which has a second airtight casing with inlet pipes operatively connected to said third and fourth transfer conveyor means to receive material therefrom, and a second mechanical conveyor in said second casing, means for varying the air pressure in said second casing between a lower pressure close to atmospheric and pipeline pressjure, and in which said control mmeans cyclically fills said second casing at said lower pressure and empties said second casing at pipeline pressure in a second continuous cycle which is out of phase with said continuous cycle.

11. The combination of claim 10 in which said second continuous cycle is effectively one-half cycle out of phase with said continuous cycle.

12. The combination of claim 10 in which the pressure mechanical conveyors are aligned end to end and extend transversely of the lines of receiving hoppers.

13. The combination of each one of the preceding claims in which the mechanical conveyor in any transfer conveyor pipe is an auger.

14. The combination of claim 13 in which the transfer conveyor means comprises first and second pipes which are in the same horizontal plane, one end portion of said first pipe overlaps an end portion of said second pipe and is in lateral communication therewith, an auger in said first pipe moves material into said second pipe, and an auger in said second pipe moves material to the material inlet of the pressure mechanical conveyor casing.

15. The combination of claim 1 which includes means providing an expansion space communicating with the material confining pipe adjacent the material inlet of the pressure mechanical conveyor casing.

16. The combination of claim 15 in which the expansion space comprises a surge hopper which communicates with the top of the material confining pipe and is substantially directly above the material inlet pipe of the pressure mechanical conveyor casing.

17. The combination of claim 16 which includes an air vent conduit between the surge hopper and the material receiving hopper.

18. A system for moving pulverulent material from a line of receiving hoppers into a pressurized air conveyor pipeline cónprising, in combination:
auger transfer conveyor means beneath said line of receiving hoppers which may receive material constantly from all said hoppers;
pressure auger conveyor means which has an effectively airtight, substantially horizontal casing, a material inlet pipe attached to the top of the casing communicating with the interior of said casing and with one end of the transfer conveyor means, a material outlet pipe attached to the bottom of the casing remote from said inlet pipe, said outlet pipe communicating with the interior of the casing and with the air conveyor pipeline through the top thereof, and a continuously operating auger conveyor in said casing to move material through said casing from said inlet pipe to said outlet pipe;
primary valve means in said inlet pipe to control movement of material into the casing;
secondary valve means in said outlet pipe to control movement of material from said casing into the air conveyor pipeline;
means for varying the air pressure in said casing between a low pressure close to atmospheric and pipeline pressure;
and control means producing a continuous cycle in which the primary valve means is first opened while the secondary valve means is closed to feed material from said auger transfer conveyor means into the casing of the pressure auger conveyor means at said low pressure until said casing is effectively full, and in which the primary valve means is then closed, the pressure in said casing is raised to pipeline pressure, and the secondary valve means is then opened to permit the auger conveyor in the casing to empty said casing while the auger transfer conveyor means moves material toward the material inlet pipe.

19. The combination of claim 18 which includes an additional line of receiving hoppers, an additional auger transfer conveyor means beneath said additional line of receiving hoppers which may receive material constantly from all the hoppers in said additional line, and additional pressure auger conveyor means which has an effectively airtight, substantially horizontal casing, a material inlet pipe attached to the top of said additional casing communicating with the interior of said additional casing and with one end of said additional transfer conveyor means, a material outlet pipe in the bottom of said additional casing remote from said last named inlet pipe, said last named outlet pipe communicating with the interior of the additional casing and with the air conveyor pipeline through the top thereof, and a continuously operating auger conveyor in said additional casing to move material through said additional casing from said last named inlet pipe to said last named outlet pipe, primary valve means in said last named inlet pipe to control movement of material therethrough, secondary valve means in said first named outlet pipe to control movement of material therethrough, means for varying the air pressure in said additional casing between said low pressure and pipeline pressure, and said control means produces an additional continuous cycle of said additional pressure auger conveyor of substantially the same duration as the first described continuous cycle and out of phase with said first described continuous cycle.

20. The combination of claim 19 in which said additional continuous cycle is substantially one-half cycle out of phase.

21. Pressure mechanical conveyor means for a system for moving pulverulent material from a receiving hopper into a pressurized air conveyor pipeline, said pressure mechanical conveyor means comprising, in combination:

an effectively airtight casing;

first and second material inlets in the top of said casing near opposite ends thereof, each of said inlets being adapted for attachment to a material transfer conveyor to receive material therefrom;

a material outlet in the bottom of the casing between said inlets, said outlet being adapted for attachment to the pressurized air conveyor pipeline to deliver material thereto;

a mechanical conveyor in the casing to move material simultaneously from both said inlets toward said outlet;

and gas receiving and venting connections on said casing adapting said casing to have its internal pressure varied between a lower pressure close to atmospheric and a higher pipeline pressure.

22. The combination of claim 21 in which the mechanical conveyor in the casing is an auger conveyor.

23. The combination of claim 22 in which the auger conveyor has a single shaft and auger flights of opposite hand on said single shaft at opposite sides of the outlet opening.

24. A system for moving pulverulent material from two receiving hoppers into a pressurized air conveyor pipeline comprising, in combination:

pressure mechanical conveyor means which has an effectively airtight casing, two material inlets in the top of said casing adjacent its ends, a material outlet in the bottom of the casing between said inlets, said outlet communicating with the top of the air conveyor pipeline, and a mechanical conveyor in said casing to move material from both said inlets toward said outlet simultaneously;

first and second transfer conveyor means each operatively connected to the bottom of one of the two receiving hoppers and to one of the two material inlets of the pressure mechanical conveyor casing, said transfer conveyor means including a material confining pipe and a mechanical conveyor in said pipe;

primary valve means to control movement of material through said inlets;

secondary valves means to control movement of material through said outlet;

means for varying the air pressure in said casing between a lower pressure chose to atmospheric and higher pipeline pressure, said means including a pressure air line which communicates with the casing at each of said inlets, air vent lines which connect both inlets with the material receiving hopper and an air vent line which connects an area of the casing immediately adjacent the outlet with the material receiving hopper;

and control means including a valve in each of said pressure lines and in each of said air vent lines, and means for closing said pressure line valves and said vent line valves alternately so said casing is filled at said lower pressure and emptied at said higher pressure in a continuous cycle.

25. In a system which includes a line of precipitator receiving hoppers which are filled by material that drops from a gas stream moving along said line so that the hoppers receive progressively less material from the most upstream hopper to the most downstream hopper, means for moving pulverulent material from said hoppers into a pressurized air conveyor pipeline comprising, in combination:

transfer conveyor means extending longitudinally beneath said line of hoppers and operatively connected to the bottoms of all said hoppers, said transfer conveyor means including a material confining pipe and a mechanical conveyor in said pipe;

pressure mechanical conveyor means which has an effectively airtight casing, a material inlet in the top of said casing which is operatively connected with said material confining pipe at the end portion thereof that is nearest to the most upstream hopper, a material outlet in the bottom of the casing remote from said inlet, said outlet communicating with the top of the air conveyor pipeline, and a mechanical conveyor in said casing to move material from said inlet toward said outlet;

primary valve means to control movement of material through said inlet;

secondary valve means to control movement of material through said outlet;

means for varying the air pressure in said casing between a lower pressure close to atmospheric and higher pipeline pressure;

and control means for filling said casing at said lower pressure and emptying said casing at said higher pressure in a continuous cycle.

26. The combination of claim 25 which includes a second line of precipitator receiving hoppers, a second transfer conveyor means including a second material confining pipe which extends beneath and is operatively connected to the bottoms of all the precipitator receiving hoppers in said second line, and a mechanical conveyor in said second material confining pipe, and in which the casing of the pressure mechanical conveyor means has a second material inlet which is operatively connected to said second material confining pipe at the end portion thereof that is nearest to the most upstream hopper in said second line, the material outlet from the casing is between said casing inlets, and the mechanical conveyor in the casing moves material simultaneously from both inlets to the outlet.

27. The combination of claim 26 in which the pressure mechanical conveyor extends transversely of the lines of receiving hoppers.

28. The combination of claim 26 which includes third and fourth lines of precipitator receiving hoppers to receive material from a gas stream and each line including a most upstream hopper, third and fourth transfer conveyor means extending longitudinally beneath and operatively connected to the bottoms of all the receiving hoppers in said third and fourth lines, each of said third and fourth transfer conveyor means including a material confining pipe and a mechanical conveyor in said pipe, a second pressure mechanical conveyor means which has a second airtight casing with inlets adjacent opposite ends operatively connected to the material confining pipes of said third and fourth transfer conveyor means to receive material from the end portions thereof that are nearest to the most upstream hopper of each of said third and fourth lines, and a second mechanical conveyor in said second casing to move said material into the pipeline, further primary and secondary valve means to control movement of material into and out of said second casing, means for varying the air pressure in said second casing between a lower pressure close to atmospheric and pipeline pressure, and in which said control means cyclically fills said second casing at said lower pressure and empties said second casing at pipeline pressure in a second continuous cycle which is out of phase with said continuous cycle.

29. The combination of claim 28 in which said second continuous cycle is effectively one-half cycle out of phase with said continuous cycle.

30. The combination of claim 28 in which the pressure mechanical conveyors are aligned end to end and extend transversely of the lines of receiving hoppers.

* * * * *